United States Patent
Raissinia et al.

(10) Patent No.: US 6,594,251 B1
(45) Date of Patent: Jul. 15, 2003

(54) POLLING FOR TRANSMISSION POWER CONTROL

(75) Inventors: Ali Raissinia, Monte Sereno, CA (US); Gregory G. Raleigh, El Granada, CA (US); Vincent K. Jones, IV, Redwood Shores, CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/348,727

(22) Filed: Jul. 6, 1999

(51) Int. Cl.[7] .............................................. H04B 7/212
(52) U.S. Cl. ...................... 370/347; 455/522
(58) Field of Search ............................. 370/347, 348, 370/439, 440; 455/69, 522

(56) References Cited

U.S. PATENT DOCUMENTS

| | | | |
|---|---|---|---|
| 5,745,480 A | * | 4/1998 | Behtash et al. ............. 370/252 |
| 5,809,431 A | * | 9/1998 | Bustamante et al. ........ 455/562 |
| 6,341,214 B2 | * | 1/2002 | Uesugi ......................... 455/69 |
| 6,341,215 B1 | * | 1/2002 | Ozluturk ...................... 455/69 |
| 6,341,224 B1 | * | 1/2002 | Dohi et al. .................. 455/522 |
| 6,442,158 B1 | * | 8/2002 | Beser .......................... 370/352 |

* cited by examiner

Primary Examiner—Nguyen T. Vo
Assistant Examiner—Nghi H. Ly
(74) Attorney, Agent, or Firm—Ritter, Lang & Kaplan LLP

(57) ABSTRACT

Systems and methods for providing enhanced subscriber unit power control in a point to multipoint communication system are provided. A central access point may send unsolicited grants of transmission time to individual subscriber units. The subscriber units use the granted transmission time to transmit upstream to the central access point for the purpose of having their output power level measured and regulated. By issuing the unsolicited grants sufficiently frequently, the central access point may maintain optimal subscriber unit transmitter power level. The power control features are particularly useful in fading environments such as found in a wireless system, especially when subscriber units do not transmit data upstream sufficiently frequently for power control to be based on measured power of data transmissions.

24 Claims, 6 Drawing Sheets

POLLING FOR TRANSMISSION POWER CONTROL

STATEMENT OF RELATED APPLICATIONS

The present application is related to the subject matter of the following co-filed, co-assigned applications. U.S. patent application Ser. No. 09/348,646, WIRELESS POWER CONTROL IN CONJUNCTION WITH A WIRELINE MAC PROTOCOL;

U.S. patent application Ser. No. 09/348,644, REALTIME POWER CONTROL IN OFDM SYSTEMS;

U.S. patent application Ser. No. 09/348,647, COMMUNICATION OF PHYSICAL LAYER CONTROL PARAMETERS;

U.S. patent application Ser. No. 09/348,719, POWER REGULATION USING MULTI-LOOP CONTROL;

U.S. patent application Ser. No. 09/348,645, OPTIMAL USE OF REQUEST ACCESS TDMA SLOTS FOR AUTOMATIC LEVEL CONTROL.

All of the related applications are incorporated by reference herein for all purposes.

BACKGROUND OF THE INVENTION

The present invention is related to digital communication systems and more particularly to systems and methods for controlling output power of subscriber units in a point to multipoint communication system.

A point to multipoint wireless communication system represents a potentially effective solution to the problem of providing broadband network connectivity to a large number of geographically distributed points. Unlike optical fiber, DSL, and cable modems, there is no need to either construct a new wired infrastructure or substantially modify a wired infrastructure that has been constructed for a different purpose.

In order to conserve scarce spectrum, the data communication devices of a point to multipoint wireless communication system may share access to a common frequency. In a typical scenario a first group of one or more frequency channels are allocated to downstream broadcast communication from a central access point to a plurality of subscriber units. A second group of one or more separate frequency channels are allocated to upstream communication from the subscriber units to the central access point. For upstream communication there is a medium access control (MAC) protocol that determines which subscriber unit is permitted to transmit at which time so as to prevent interference.

For a given upstream frequency, the time domain is divided into frames which are typically of equal duration. Each frame represents an individually allocable unit in the time domain. One subscriber unit transmits in each frame. Reservations for transmission in a particular frame are made by the central access point and distributed in broadcast downstream transmissions. Such a scheme is referred to as a time domain multiple access scheme (TDMA).

In such a point to multipoint wireless communication system, it is generally preferable to centrally control the transmission power of each subscriber unit. Each subscriber unit should transmit at a power sufficient to ensure accurate reception of its transmission yet not so high so as to overload the front end of the central access points' receiver or cause interference to unintended receivers. Power control involves monitoring subscriber unit transmitted power at the central access point and sending power adjustment information downstream to maintain power at the desired level.

Cable modem systems also require access to a shared medium and subscriber unit power control. It would be desirable to simply adopt a MAC protocol already developed for cable applications to the wireless context. One such protocol that has been developed is referred to as the MCNS protocol. The MCNS protocol is described in the Data-over-Cable Service Interface Specifications, Radio Frequency Interface Specification, SP-RFI-I04-980724, (Cable Television Laboratories, 1997), the contents of which are herein incorporated by reference.

A cable MAC layer like MCNS is already implemented in low cost chip sets. The operational characteristics of MCNS are well known. Higher layer protocol hardware and software has been developed to interoperate with MCNS. Furthermore, it is desirable to maintain parts commonality between wireless modems and cable modems to the extent possible.

The MCNS protocol provides for controlling the power of subscriber units. In one implementation, the power control function is combined with monitoring of the round trip propagation delay between the central access point and individual subscriber units. Periodically, the central access point sends a ranging request message to a particular subscriber unit. In response to the ranging request message, the subscriber unit sends a ranging response to the central access point. Based on this transmission, the central access point establishes a round trip propagation delay and sends this value to the subscriber unit. The central access point measures the power level of the ranging response message. Based on the power measurement, the central access point sends the subscriber unit power adjustment information to help the subscriber unit set its power so that it will be received at a desired level.

This combined ranging and power control operation is, however, relatively infrequent, occurring approximately every two seconds in typical implementations. This MAC layer power control operation cannot easily be made more frequent because of the limited processing power provided by equipment implementing the MCNS protocol. Also, each subscriber unit's ranging response requires allocation of a special extended MAC frame to allow for uncertainty in response time, causing frequent updates to reduce system efficiency.

In a wireless system, the frequency of power control operations available with MCNS is insufficient. Channel response may vary too rapidly for the MCNS power control system to react. If hundreds of milliseconds have passed since the last update to the subscriber unit's power level, new data transmitted by the subscriber unit may be included in a transmission having an either excessive or insufficient power level received at the head end.

What is needed are systems and methods for providing more rapid update of subscriber unit power level. It is also desirable to interoperate with wireline MAC protocols.

SUMMARY OF THE INVENTION

Systems and methods for providing enhanced subscriber unit power control in a point to multipoint communication system are provided by virtue of the present invention. A central access point may send unsolicited grants of transmission time to individual subscriber units as part of a polling process. The subscriber units use the granted transmission time to transmit upstream to the central access point for the purpose of having their output power level measured and regulated. By issuing the unsolicited grants sufficiently frequently, the central access point may maintain optimal subscriber unit transmitter power level. The power control features of the present invention are particularly useful in fading environments such as found in a wireless system, especially when subscriber units do not transmit data upstream sufficiently frequently for power control to be based on measured power of data transmissions.

A first aspect of the present invention provides apparatus for operating a central access point in a digital communication system. The apparatus includes: a network management processor that sends a network management message to a subscriber unit. The network management message includes an unsolicited grant of a time slot for transmission from the subscriber unit to the central access point via a medium shared among multiple subscriber units. The apparatus further includes a physical layer system that receives within the time slot an upstream message from the subscriber unit, measures a received power level of the message, and sends the subscriber unit power adjustment information based on the received power level.

A second aspect of the present invention provides apparatus for operating a subscriber unit in a digital communication system. The apparatus includes a network management access control processor that receives a network management message from a central access point. The network management message includes an unsolicited grant of a time slot for transmission from the subscriber unit to the central access point via a medium shared among multiple subscriber units. The apparatus further includes a physical layer control processor that transmits within the timeslot an upstream message to the central access point, receives from the central access point power adjustment information based on a power level of the upstream message as received by the central access point, and adjusts transmit power of the subscriber unit based on the power adjustment information.

Further understanding of the natures and advantages of the invention herein may be realized by reference to the remaining portions of the specification and the attached drawings.

BREIF DESCRIPTION OF THE DRAWINGS

DESCRIPTION OF SPECIFIC EMBODIMENTS

Figure 1:
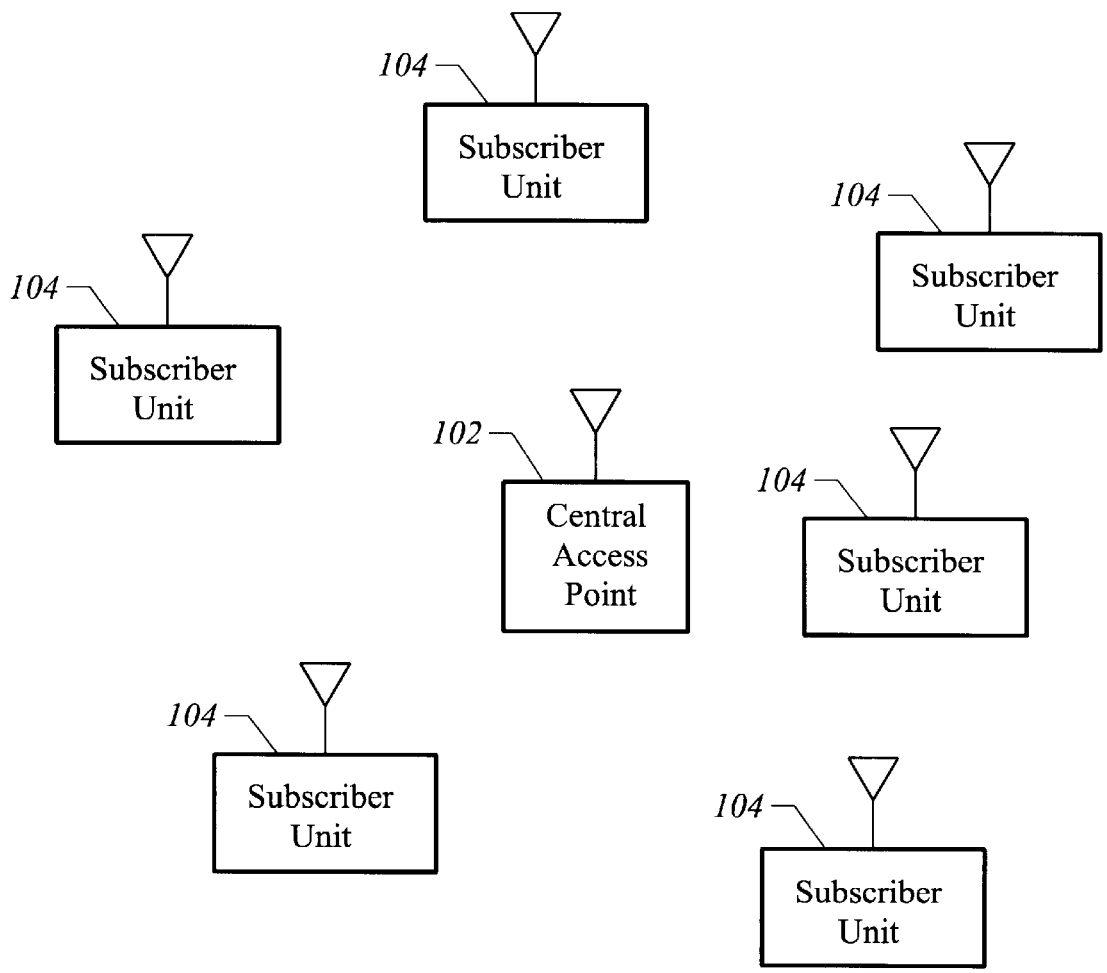
FIG. 1 depicts a point to multipoint communication system according to one embodiment of the present invention.

FIG. 1 depicts a point to multipoint wireless communication network 100 suitable for implementing one embodiment of the present invention. Network 100 includes a central access point or head end 102 and multiple subscriber units 104. All communication is typically either to or from central access point 102. Communication from central access point 102 to one or more subscriber units 104 is herein referred to as downstream communication. Communication from any one of subscriber units 104 to central access point 102 is herein referred to as upstream communication. In one embodiment, different frequencies are allocated to upstream and downstream communication. In alternate embodiments, subscriber units 104 may communicate with each other directly.

Each of one or more upstream frequencies is common to multiple subscriber units. To prevent collisions between subscriber units when accessing the shared medium, a medium access control (MAC) protocol is provided. According to one embodiment of the present invention, a MAC protocol developed for data transmission over cable systems may be used to coordinate upstream communications in wireless network 100. An exemplary MAC protocol of this type is the so-called MCNS protocol described in the Data-over-Cable Service Interface Specifications, Radio Frequency Interface Specification, SP-RFI-I02-971008, (Cable Television Laboratories, 1997).

MCNS employs a time domain multiple access (TDMA) scheme to allocate access to the shared upstream frequency among multiple subscriber units 104. The entities controlling operation according to the MAC protocol at central access point 102 and subscriber units 104 are referred to collectively as the MAC layer. This identifies these entities as representing a layer in a multi-layer communication model. In reference to the well-known OSI multi-level model of data communications, the MAC layer as it is discussed here corresponds to a lowest sublayer of the data link layer. Underneath the MAC layer is the physical layer which is responsible for transmitting and receiving bits over the wireless channel. The MAC layer implements a TDMA scheme for upstream communication. Each of one or more frequencies is divided into a series of frames or minislots in the time domain.

Figure 2:
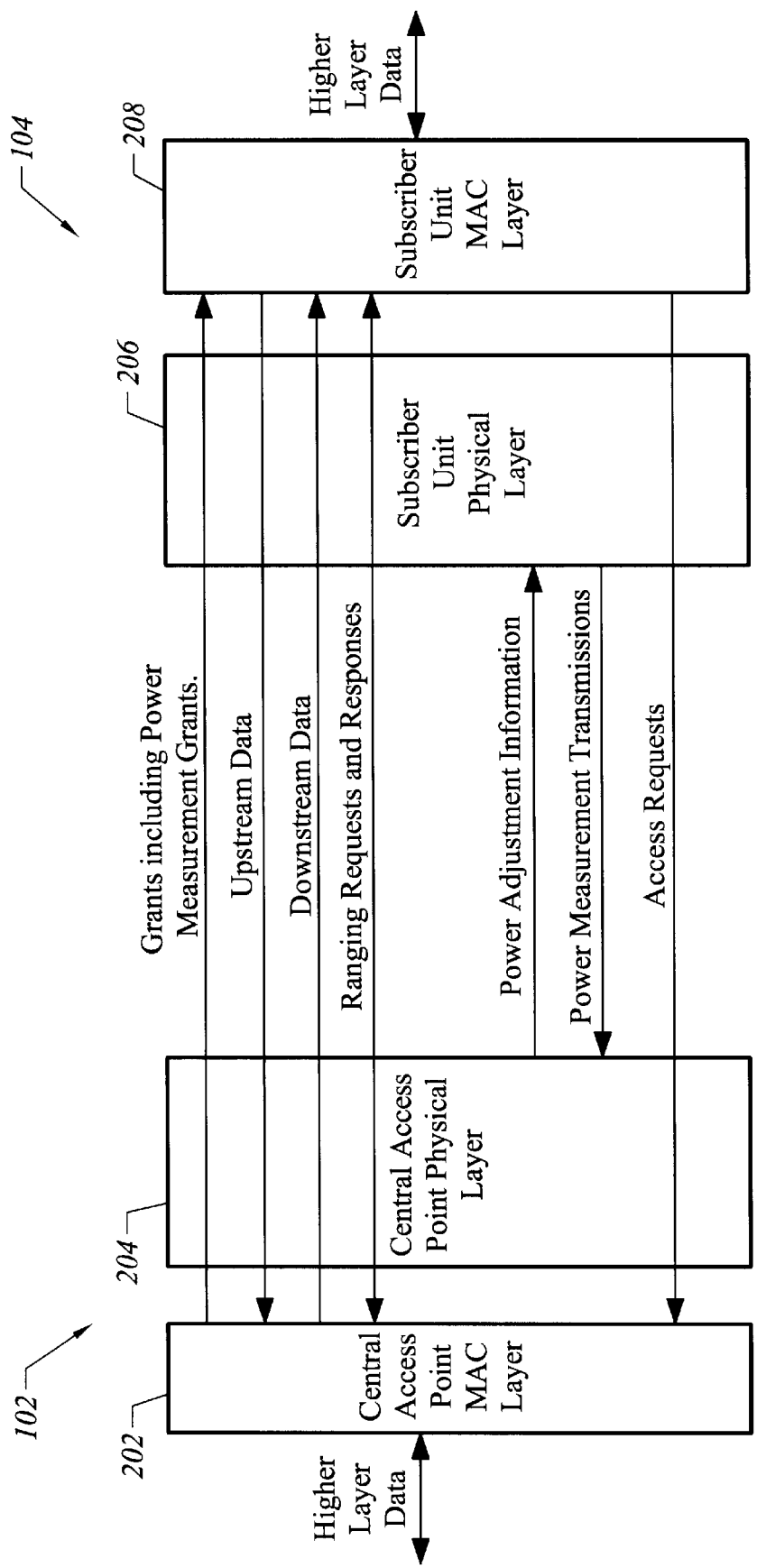
FIG. 2 depicts the interchange of messages between physical layer and MAC layer entities at a subscriber unit and a central access point according to one embodiment of the present invention.

FIG. 2 depicts interactions between central access point 102 and one of subscriber units 104. Central access point 102 includes a central access point MAC layer block 202 and a central access point physical layer block 204. Subscriber unit 104 includes a subscriber unit physical layer block 206 and a subscriber unit MAC layer block 208. In one embodiment, central access point MAC layer block 202 and subscriber unit MAC layer block 208 collectively operate according to the MCNS protocol.

Data and MAC layer network management information are passed between MAC layer block 202 and 208 via physical layer blocks 204 and 206 which are directly responsible for exchange of bits across the wireless channel. Central access point 102 has exclusive access to at least one frequency for downstream transmissions. Subscriber unit 104, however, shares access to one or more upstream transmission frequencies in accordance with the MAC protocol.

Each subscriber unit 104 is assigned one or more MAC layer addresses. In MCNS applications, the MAC layer addresses are known as SIDs. Multiple SIDs are assigned to individual data services at a subscriber unit. For example, voice traffic at a particular subscriber unit may be designated by a particular SID with other types of data being assigned a different SID. According to the present invention, subscriber units may also be assigned a SID for purposes of power measurement. The various SID values may be assigned when a subscriber unit powers on and registers to the central access point. There may also be multicast SIDs that each designate multiple subscriber units for the purpose of power measurement.

One class of network management messages exchanged between central access point MAC layer 202 and subscriber unit MAC layer block 208 implements ranging, the process of establishing the round trip propagation delay between central access point 102 and subscriber unit 104. Each ranging request includes an SID of subscriber unit 104 or a multicast SID designating multiple subscriber units 104. In one embodiment, the requests are sent approximately every two seconds. Ranging responses occur at times reserved by central access point MAC layer block 202 for upstream ranging transmission from subscriber unit 104. When a multicast SID is specified, a series of frames are reserved for responses from the multiple subscriber units. Each subscriber unit sharing the multicast SID has its own fixed position within the series of frames.

The power level of the ranging response is measured within central access point physical layer block 204. MCNS employs these power measurements to control subscriber unit transmitter power level. Central access point MAC layer block 202 sends power adjustment commands to subscriber unit MAC layer block 208 to implement this power control. These MAC layer power adjustment commands are herein referred to as slow loop power adjustment commands.

Central access point MAC layer block 202 and subscriber unit MAC layer 208 also act as data interfaces to higher layers. Application data including, e.g., voice, video, computer files, etc. is exchanged between the MAC layer blocks. Higher layer entities serve as the origin and destination for this data.

When subscriber unit MAC layer 208 has application data ready for upstream transmission to central access point MAC layer block 202, it transmits a special network management message known as an access request (RA). MAC layer protocols such as MCNS allocate certain time domain slots for transmission of access requests. In response to access requests, central access point MAC layer block 202 sends grants downstream to the various subscriber units 104. A downstream grant message includes SIDs for various subscriber unit data services accompanied by times reserved for their upstream transmission of data.

Grants may occur as a result of access requests or they may be unsolicited. According to the present invention, an unsolicited grant may include one or more SID values that signal individual subscriber units to send special power measurement transmissions upstream. Such unsolicited power measurement grants may occur much more frequently than the MAC layer ranging requests. When the subscriber unit hears its particular power SID, it sends a special power measurement transmission upstream at the time scheduled in the grant. The subscriber unit may hear a multicast power SID that it shares and respond by sending the power measurement transmission upstream in a pre-reserved one of a series of frames specified in the grant. Central access point physical layer block 204 measures the power in the upstream power measurement transmission and formulates power adjustment information for transmission downstream to subscriber unit physical layer block 206. Subscriber unit physical layer block 206 can then adjust its output power transmission level in response to the power adjustment information.

Frequent transmissions of the unsolicited power measurement grants can implement a power control loop that has a much faster response time than one based only on the MAC layer ranging messages. This is because the necessary operations may be implemented in the physical layer without involving any MAC layer processor or the system CPU.

Figure 3:
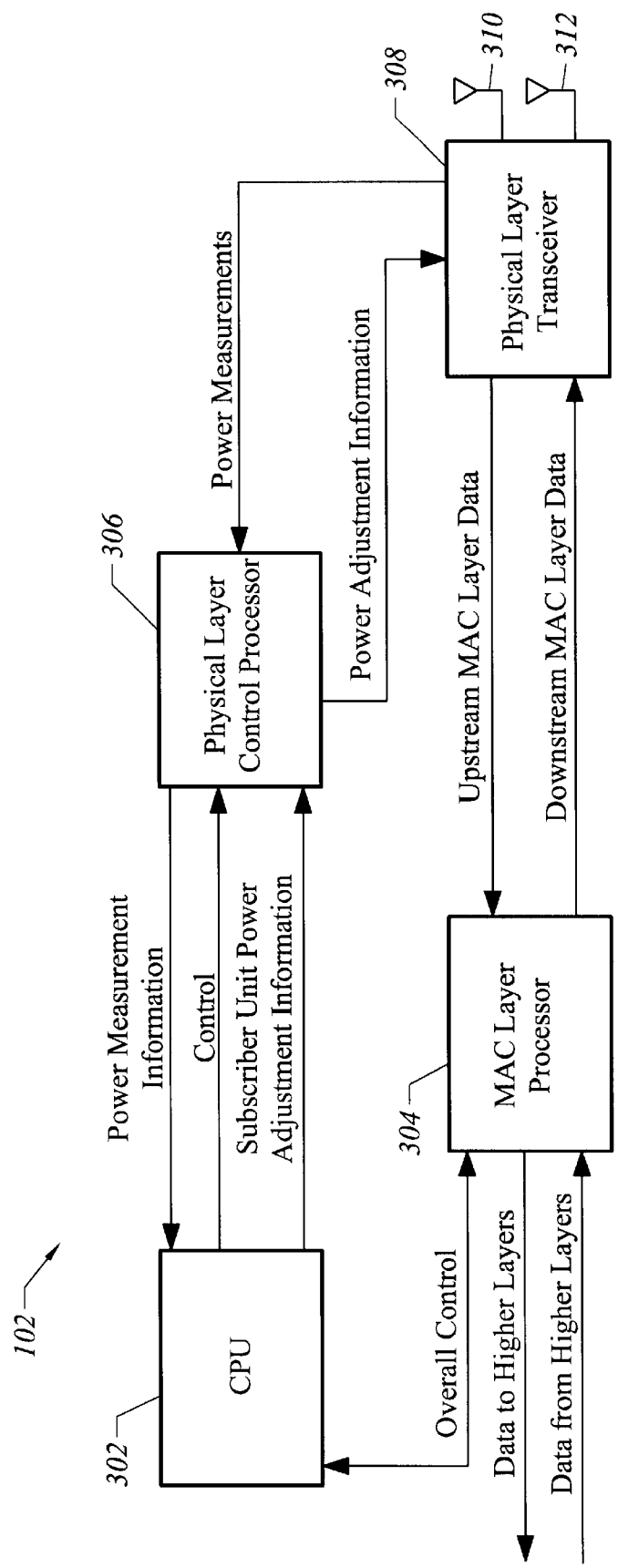
FIG. 3 depicts elements of a central access point of a point to multipoint communication system according to one embodiment of the present invention.

FIG. 3 depicts elements of central access point 102 according to one embodiment of the present invention. Central access point 102 includes a CPU 302 that controls overall operation. A MAC layer processor 304 is primarily responsible for controlling MAC layer functions and serving as an interface to higher layer entities. MAC layer processor 304 controls the transmission and reception of messages shown in FIG. 2 as being transmitted or received by central access point MAC layer block 202. In one embodiment, central access point MAC layer processor 304 may be a BCM3210B integrated circuit available from Broadcom, Inc. of Irvine Calif. Central access point physical layer block 204 is depicted as including a physical layer control processor 306 and a physical layer transceiver 308. Physical layer transceiver 308 is equipped with a transmitter antenna 310 and a receiver antenna 312. In one embodiment, CPU 302 also incorporates the functions of physical layer processor 306 and/or MAC layer processor 304.

Physical layer transceiver 308 includes a modem for converting received analog signals to digital data and for converting digital data to be transmitted to analog. Physical layer transceiver 308 also incorporates necessary RF and IF subsystems both for upconverting analog transmitter signals to RF frequency and downconverting received RF signals to baseband. Physical layer transceiver 308 also incorporates hardware for measuring power of individual transmissions from subscriber units. These power measurements are forwarded to physical layer control processor 306.

The primary source of digital transmission data for physical layer transceiver 308 is the downstream MAC layer data and higher layer data forwarded by MAC layer processor 304. Also, however, there is power adjustment information to be sent downstream that is received from physical layer control processor 306. Physical layer transceiver 308 sends this power adjustment information downstream in a manner that is transparent to MAC layer operation. One scheme for downstream transmission of this power adjustment information is described in the patent application entitled COMMUNICATION OF PHYSICAL LAYER CONTROL PARAMETERS.

Physical layer control processor 306 receives power measurements from physical layer transceiver 308. Certain of the power measurements may be based on upstream ranging transmissions. These are MAC layer power measurements and they are forwarded to MAC layer processor 304 which will then incorporate its own power adjustments information within downstream MAC layer data. Other power measurements are based on special upstream power measurement transmissions generated in response to unsolicited grants. Physical layer control processor 306 determines power adjustment information based on these power measurements and sends the power adjustment information to physical layer control processor 306. Physical layer control processor 306 in turn forwards the power adjustment information to physical layer transceiver 308 for downstream transmission. Alternatively, as shown in FIG. 3, CPU 302 may determine power adjustment information.

Figure 4:
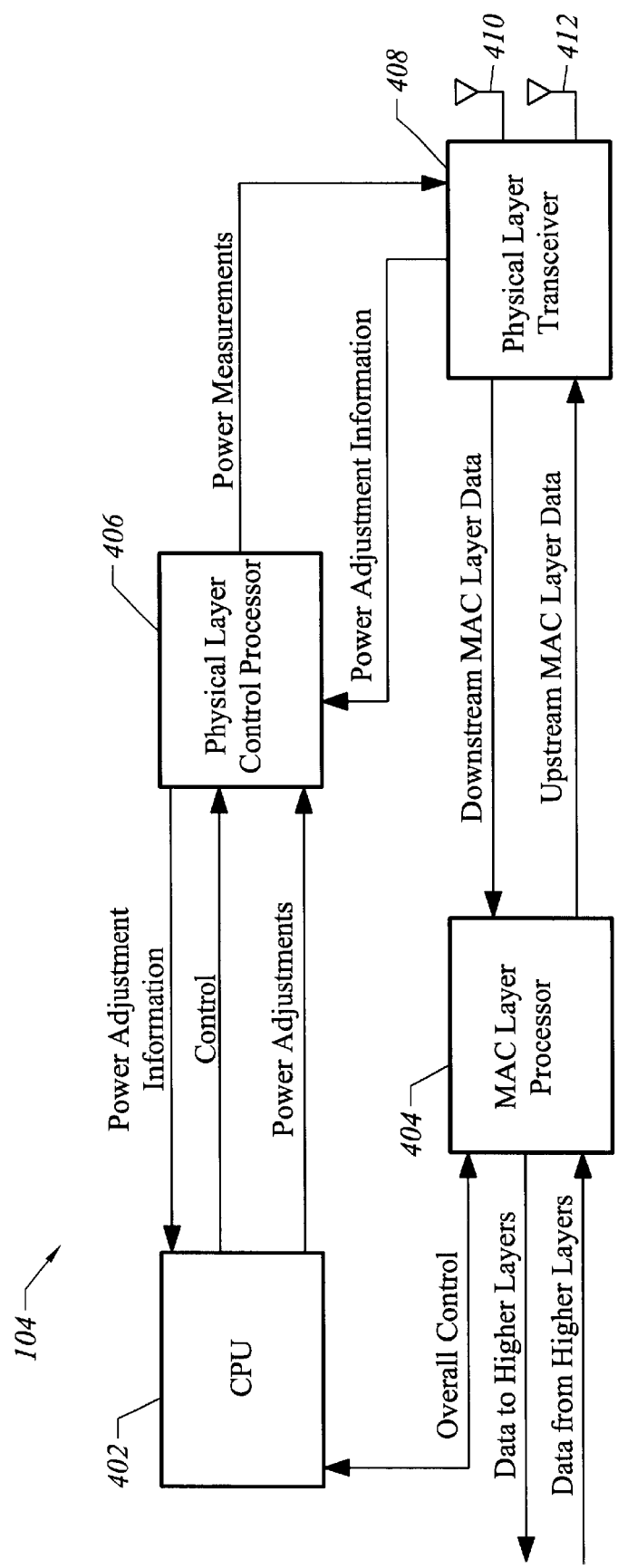
FIG. 4 depicts elements of a subscriber unit of a point to multipoint communication system according to one embodiment of the present invention.

FIG. 4 depicts elements of a representative subscriber unit 104 according to one embodiment of the present invention. A CPU 402 is responsible for overall control. A MAC layer processor 404 substantially implements the functionality of subscriber unit MAC layer block 208. MAC layer processor 404 also acts as a data interface to higher layers. In an MCNS embodiment, MAC layer processor 404 may be a BCM3300 integrated circuit provided by Broadcom.

A physical layer control processor 406 and a physical layer transceiver 408 together implement the functionality of subscriber unit physical layer block 206 shown in FIG. 2. Physical layer transceiver 408 is equipped with a transmitter antenna 410 and a receiver antenna 412. Physical layer transceiver 408 includes a modem for transforming digital data into analog modulated signals for transmission and for transforming received modulated analog signals into digital data. Physical layer transceiver 408 also incorporates an RF receiver system for downconverting a received RF signal to a baseband signal while providing necessary filtering and amplification. Physical layer transceiver 408 also includes an RF transmitter system that upconverts baseband and provides necessary filtering and amplification. Physical layer transceiver 408 is capable of setting its output transmitter power level in response to power adjustment commands received from physical layer control processor 406.

Physical layer transceiver 408 receives its digital data for transmission from MAC layer processor 404. Received digital data output by physical layer transceiver 408 is primarily MAC layer data forwarded to MAC layer processor 404. There is also power adjustment information, however, that is handled by the physical layer. This power adjustment information is forwarded to physical layer control processor 406. The reception of this power adjustment information in a way that is transparent to the MAC layer is discussed in the application entitled COMMUNICATION OF PHYSICAL LAYER CONTROL PARAMETERS.

Physical layer control processor 406 computes power adjustments that are forwarded to physical layer transceiver 408 for adjustment of transmitter output power. Techniques for determining output power level are described in the patent application entitled POWER REGULATION USING MULTI-LOOP CONTROL. In one embodiment, the functionality of physical layer control processor 406 is integrated with that of CPU 402.

Figure 5:
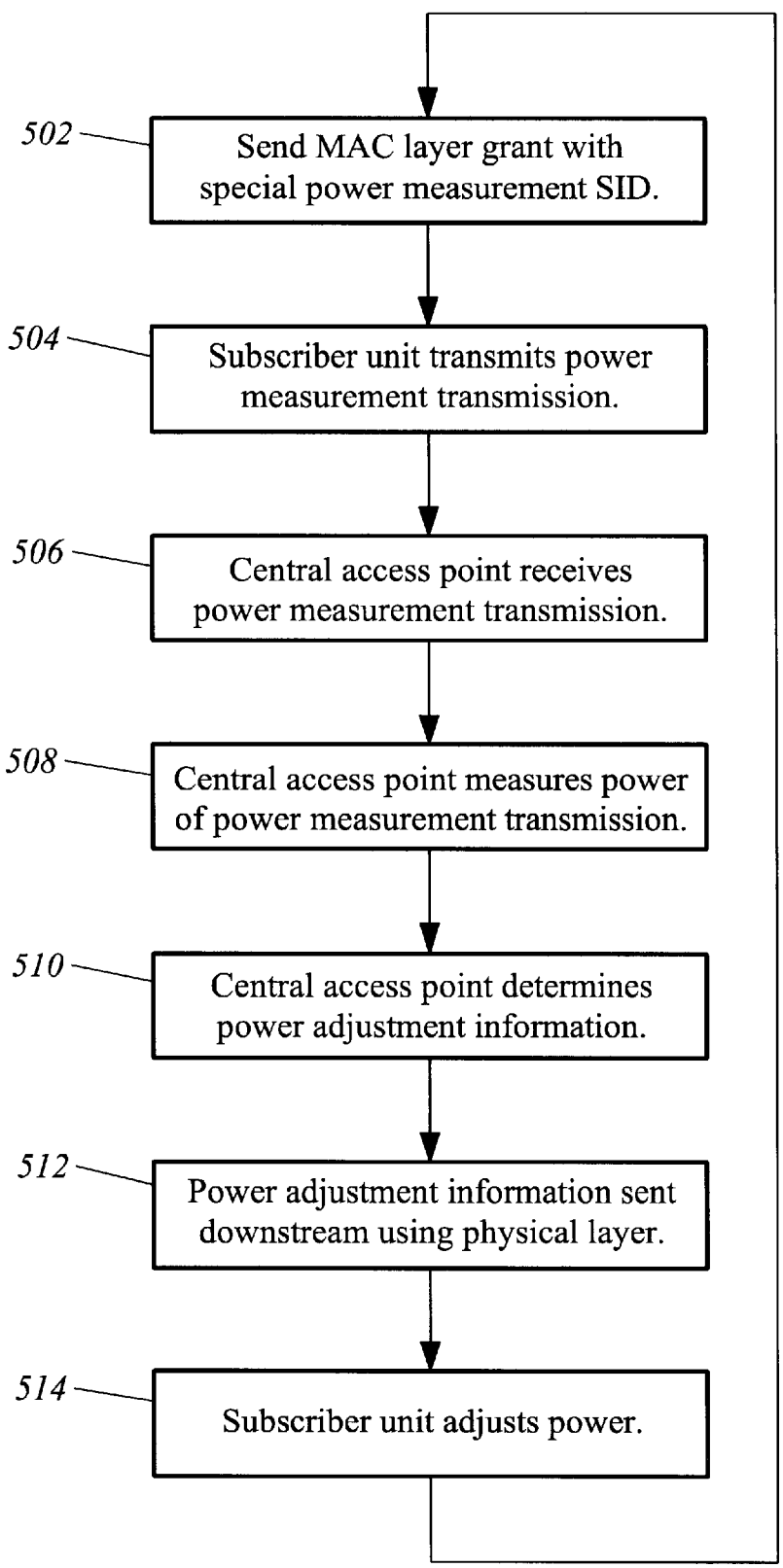
FIG. 5 is a flowchart describing steps of controlling subscriber unit output power according to one embodiment of the present invention.

FIG. 5 is a flowchart describing steps of controlling subscriber unit power level according to one embodiment of the present invention. At step 502, central access point MAC layer block 202 sends a MAC layer grant message to a particular subscriber unit 104. The grant specifies a time for a requested upstream power measurement transmission by the addressed subscriber unit. The addressed subscriber unit is specified in the grant by using a special power measurement SID value previously assigned to the subscriber unit. One grant may include power measurement SIDs for multiple subscriber units with associated transmission times. Alternatively, a group of subscriber units are addressed using a single multicast SID, reducing message traffic and general power control overhead.

According to the present invention, the grant need not be solicited by any subscriber unit. The process of issuing unsolicited grants is also known as polling.

The addressed subscriber unit detects the grant as including its own power measurement SID or shared multicast SID. This detection may occur within physical layer transceiver 308 or within MAC layer processor 304. In response, subscriber unit 104 transmits a power measurement transmission upstream at the scheduled time at step 504.

If the grant is for multiple subscriber units, they may transmit in successive slots. Alternatively, a single MAC layer slot is reserved for multiple simultaneous power measurement transmissions by multiple subscriber units. This can be accomplished by employing orthogonal frequency division multiplexing (OFDM) transmission techniques wherein the upstream frequency allocation is divided into orthogonal subchannels. Each of the multiple subscriber units will then employ its own subset of the subchannels for transmitting power measurement information upstream. Such a scheme is disclosed in the co-filed, co-assigned patent application entitled REALTIME POWER CONTROL IN OFDM SYSTEMS.

In a further alternative embodiment, a single MAC layer frame is divided into multiple physical layer frames. Such a scheme is disclosed in the patent application entitled WIRELESS POWER CONTROL IN CONJUNCTION WITH A WIRELINE MAC PROTOCOL. A single MAC layer frame may then include, e.g., power measurement transmissions by multiple subscriber units, or a power measurement transmission from one subscriber unit in combination with a data transmission form the same subscriber unit or a different subscriber unit.

The power measurement transmissions may consist simply of predefined values. In an alternative embodiment, the power measurement transmissions may include a numerical value representing current transmitter output power value to facilitate power adjustment calculations at central access point 102. It is also possible for the power measurement transmission to incorporate an access request or data. It may then be necessary to also incorporate special training symbols to facilitate measurement of the channel at central access point 104. If the power measurement transmission also includes an access request, that access request will not contend with other access requests for use of the medium.

At step 506, central access point 102 receives the power measurement transmission whether it includes data, an access request, or simply predefined values. At step 508, central access point 102 measures the power in this power measurement transmission. This measurement is performed within physical layer transceiver 308. Central access point 102 then determines power adjustment information for subscriber unit 104. The power adjustment information may simply be the raw power measurement, an estimate of the channel response between subscriber unit 104 and central access point 102, or it may be a specific adjustment factor in decibels. The determination of power adjustment information to be sent downstream occurs at step 510.

At step 512 the power adjustment information is sent downstream from central access point 102 to subscriber unit 104. In one embodiment, the power adjustment information is sent from central access point physical layer block 204 to subscriber unit physical layer block 206 in a manner that is transparent to MAC layer operation.

Subscriber unit 104 receives the power adjustment information and determines its own power adjustment in response. If the received power adjustment information takes the form of raw power measurements or channel estimates, subscriber unit 104 may then perform a substantial portion of the power adjustment calculation. Alternatively, subscriber unit 104 may simply implement a specific power adjustment mandated by central access point 102. Any necessary power adjustment calculations may be performed by either CPU 402 or physical layer control processor 406. Subscriber unit 104 adjusts its power according to the received or calculated power adjustment at step 514.

The power adjustment process defined by steps 502 through 514 will repeat periodically for each subscriber unit. In one representative embodiment, each subscriber unit is sent an unsolicited power measurement grant every 100 milliseconds. The interval will vary depending on how rapid a variation in channel response is expected. Physical layer control processor 306 will construct an overall schedule of unsolicited grants to assure that each subscriber unit has its output power interrogated and controlled with sufficient frequency.

Figure 6:
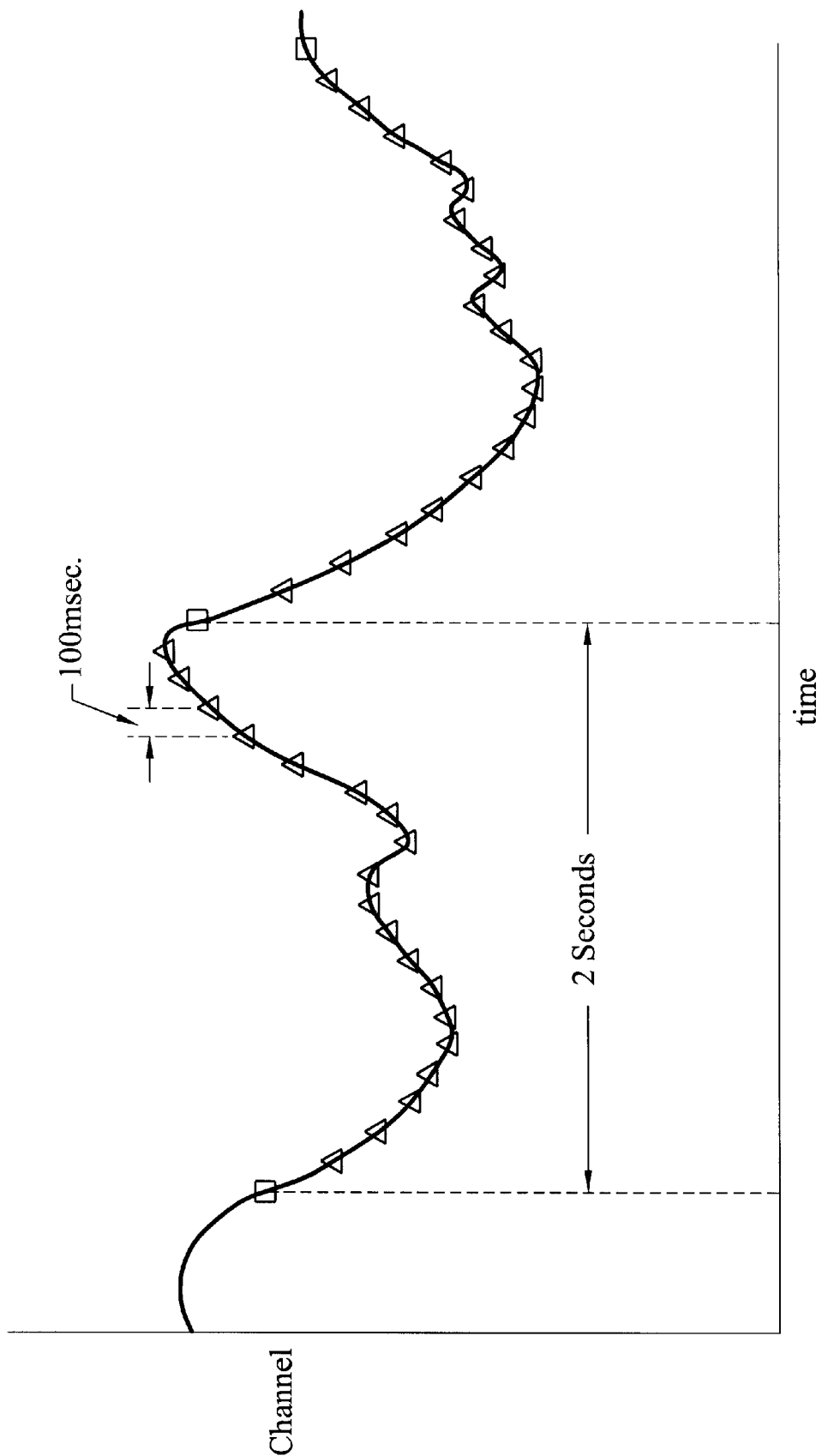
FIG. 6 depicts a sequence of power measurements in the time domain according to one embodiment of the present invention.

FIG. 6 depicts measurements of a particular subscriber unit's output power over time. The horizontal axis denotes time. The vertical axis denotes a magnitude of channel response from subscriber unit 104 to central access point 102. The depicted signal indicates the variation in channel response over time. Each square superimposed on the channel response represents a ranging operation where central access point 102 may measure the power of the subscriber unit's ranging response. Each triangle represents an upstream power measurement from subscriber unit 104 that is caused by an unsolicited grant sent downstream. The interval between successive ranging transmissions is two seconds. It can be seen that there is substantial variation in the channel response within this two second interval. If power control relied on these ranging transmissions exclusively, a data transmission made during a trough of the channel response, also known as a fade, might be made at too low power for accurate reception by central access point 102.

By contrast, the interval between power measurement transmission resulting from unsolicited grants is only 100 milliseconds. In a representative wireless application, this is a sufficiently small interval to provide accurate control of subscriber unit output power. The interval between unsolicited power measurement grants will preferably be inversely proportional to a parameter known as the fading bandwidth. The fading bandwidth is the 3 dB bandwidth of a signal representing the channel response variation over time.

It will be understood that the examples and embodiments described herein are for illustrative purposes only and various modifications and changes in like thereof will be suggested to persons skilled in the art are to be included in the spirit and purview of this application and the scope of the appended claims. For example, the present invention may be applied to wireline systems. All publications, patents, and patent applications cited herein are hereby incorporated by reference.

What is claimed is:

1. In a digital communication system, a method for operating a central access point, the method comprising:

sending a network management message to a subscriber unit, said network management message including an unsolicited grant of a time slot for transmission from said subscriber unit to said central access point via a medium shared among multiple subscriber units;

receiving within said time slot a message from said subscriber unit;

measuring a received power level of said message; and sending said subscriber unit power adjustment information based on said received power level; and wherein sending said network management message, receiving, measuring, and sending said power adjustment information are repeated at a rate chosen responsive to a fading bandwidth of said shared medium.

2. The method of claim 1 wherein said message from said subscriber unit comprises a request for access to said shared medium.

3. The method of claim 1 wherein sending said network management message comprises sending a downstream message according to MCNS protocol.

4. The method of claim 1 wherein sending said network management message comprises employing a MAC layer protocol and wherein sending said subscriber unit power adjustment information comprises employing a physical layer protocol.

5. In a digital communication system, a method for operating a subscriber unit comprising:

receiving a network management message from a central access point, said network management message including an unsolicited grant of a time slot for transmission from said subscriber unit to said central access point via a medium shared among multiple subscriber units;

transmitting within said time slot an upstream message to said central access point;

receiving from said central access point power adjustment information developed based on a power level of said upstream message as received by said subscriber unit; and adjusting transmit power of said subscriber unit based on said power adjustment information; and wherein said receiving a network management message, transmitting an upstream message, receiving power adjustment information, and adjusting transmit power are repeated at a rate chosen responsive to a fading bandwidth of said shared medium.

6. The method of claim 5 wherein said upstream message comprises a request for access to said shared medium.

7. The method of claim 5 wherein said network management message comprises an MCNS protocol message.

8. The method of claim 7 wherein said network management message comprises a MAC layer message and said subscriber unit power adjustment information is included within a physical layer message.

9. In a digital communication system, apparatus for operating a central access point, said apparatus comprising:

a network management processor that sends a network management message to a subscriber unit, said network management message including an unsolicited grant of a time slot for transmission from said subscriber unit to said central access point via a medium shared among multiple subscriber units; and a physical layer system that receives within said time slot an upstream message from said subscriber unit, measures a received power level of said message, and sends said subscriber unit power adjustment information based on said received power level; and wherein said network management processor sends at a rate chosen responsive to a fading bandwidth of said shared medium.

10. The apparatus of claim 9 wherein said message from said subscriber unit comprises a request for access to said shared medium.

11. The apparatus of claim 9 wherein said network management message comprises a downstream message defined by MCNS protocol.

12. The apparatus of claim 9 wherein said network management message comprises a MAC layer protocol and wherein said subscriber unit power adjustment information comprises a physical layer protocol.

13. In a digital communication system, apparatus for operating a subscriber unit, said apparatus comprising:

a network management processor that receives a network management message from a central access point, said network management message including an unsolicited grant of a time slot for transmission from said subscriber unit to said central access point via a medium shared among multiple subscriber units; and a physical layer control processor that transmits within said time slot an upstream message to said central access point, receives from said central access point power adjustment information based on a power level of said upstream message as received by said central access point, and adjusts transmit power of said subscriber unit based on said power adjustment information; and wherein said network management processor repeatedly receives said network management message, at a rate chosen responsive to a fading bandwidth of said shared medium.

14. The apparatus of claim 13 wherein said upstream message comprises a request for access to said shared medium.

15. The apparatus of claim 13 wherein said network management message comprises an MCNS protocol message.

16. The apparatus of claim 15 wherein said network management message comprises a MAC layer message and said subscriber unit power adjustment information is included within a physical layer message.

17. In a digital communication system, apparatus for operating a central access point, said apparatus comprising:

means for sending a network management message to a subscriber unit, said network management message including an unsolicited grant of a time slot for transmission from said subscriber unit to said central access point via a medium shared among multiple subscriber units;

means for receiving within said time slot a message from said subscriber unit; means for measuring a received power level of said message; and means for sending said subscriber unit power adjustment information based on said received power level; and wherein said means for sending said network management message, means for receiving, means for measuring, and means for sending said power adjustment information are repeatedly invoked at a rate chosen responsive to a fading bandwidth of said shared medium.

18. The apparatus of claim 17 wherein said message from said subscriber unit comprises a request for access to said shared medium.

19. The apparatus of claim 17 wherein said means for sending said network management message comprises means for sending a downstream message according to MCNS protocol.

20. The apparatus of claim 17 wherein said means for sending said network management message comprises means for employing a MAC layer protocol and wherein said means for sending said subscriber unit power adjustment information comprises means for employing a physical layer protocol.

21. In a digital communication system, apparatus for operating a subscriber unit, said apparatus comprising;

means for receiving a network management message from a central access point, said network management message including an unsolicited grant of a time slot for transmission from said subscriber unit to said central access point via a medium shared among multiple subscriber units;

means for transmitting within said time slot an upstream message to said central access point; means for receiving from said central access point power adjustment information developed based on a power level of said upstream message as received by said subscriber unit; and means for adjusting transmit power of said subscriber unit based on said power adjustment information; and wherein said means for receiving a network management message, means for transmitting an upstream message, means for receiving power adjustment information, and means for adjusting transmit power are repeatedly invoked at a rate chosen responsive to a fading bandwidth of said shared medium.

22. The apparatus of claim 21 wherein said upstream a request for access to said shared medium.

23. The apparatus of claim 21 wherein said network management message comprises an MCNS protocol message.

24. The apparatus of claim 23 wherein said network management message comprises a MAC layer message and said subscriber unit power adjustment information is included within a physical layer message.

* * * * *